PULSE SOURCE FOR MAGNETIC CORES
Filed Nov. 30, 1961
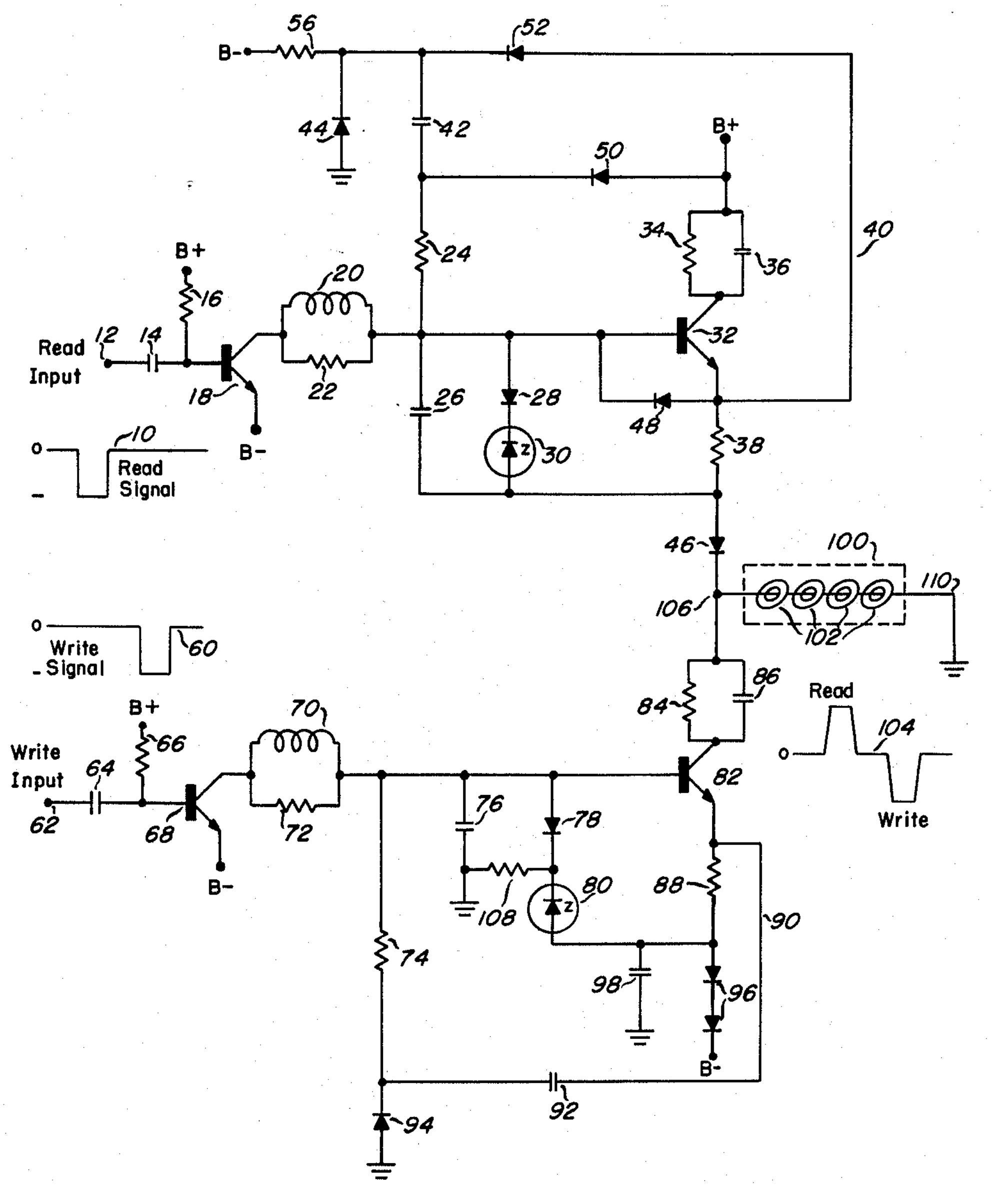
INVENTORS.
NORMAN M. LOURIE
EDWARD G. FASSINO
BY Fred Jacob
ATTORNEY 3,119,025
Patented Jan. 21, 1964

3,119,025

PULSE SOURCE FOR MAGNETIC CORES

Norman M. Lourie, Newton Center, and Edward G. Fassino, Natick, Mass., assignors to Minneapolis-Honeywell Regulator Company, Minneapolis, Minn., a corporation of Delaware Filed Nov. 30, 1961, Ser. No. 155,980
13 Claims. (Cl. 307—88)

The present invention relates in general to a circuit capable of supplying constant amplitude current pulses to a variable impedance load and more particularly to an improved read-write drive circuit for a magnetic core memory.

Coincident current core memories of the type having a number of substanially identical memory planes are well known today. Each plane contains bistable magnetic cores arranged in coordinate rows and columns and linked by row and column drive windings. Each row and column drive winding respectively in a plane is serially connected with its corresponding counterparts in the other planes in the memory. Each core plane further includes a sense winding as well as an inhibit winding which links all the cores in that plane.

Binary information may be simultaneously written into corresponding cores of the respective core planes by applying coincident current drive pulses of the same polarity to a selected row and column drive winding. Since each such drive pulse provides a half-select current, only that core in each memory plane which is linked by a pair of energized drive windings will receive the full-select current necessary to switch it to the opposite stable state, hereinafter referred to as the "one" state. If it is desired to write a binary "zero" into a selected core, the inhibit winding linking that core is activated concurrently with the application of the two half-select write current drive pulses. The inhibit current pulse is a half-select current pulse of a polarity opposite that of the write current drive pulses so that the net current applied to the core is only half-select current which is incapable of switching the core which will remain in its "zero" state.

During the read interval, half-select current drive pulses of the aforesaid opposite polarity are applied to the selected row and column drive windings. If the core being read out was in the "zero" state, a zero output signal is obtained. If the core which is being read out was previously set to the "one" state, it will be switched to the "zero" state by the read pulses. The resulting flux reversal within the core induces a signal in the associated sense winding which signifies the readout of a binary "one."

In order to distinguish between a binary "one" readout signal and undesirable signals induced in the sense winding by such cores as are linked by that winding which has half-select drive pulses applied thereto, the sense winding is "strobed" or sampled during a brief time interval when the peak amplitude of the binary "one" readout signal is expected to occur. As a consequence the undesirable noise signals, which frequently lead or lag the true readout signal, are discriminated against.

The waveshape of the readout signal induced in the sense winding depends to a great extent upon the rise time and maximum amplitude of the read drive pulses applied to the selected drive windings. Variations of the drive pulse characteristics will produce variations in the maximum amplitude and time occurrence of the readout signal derived from a core. Accordingly, in order to obtain an output waveform on the sense winding whose peak signal amplitude is constant and which occurs during a specified strobing period, the rise time and amplitude of the drive pulse signals must be accurately controlled.

Presently available drive pulse sources in use with coincident current core memories are sensitive to impedance changes of the driven magnetic core load. Where this is the case, the aforementioned drive pulse characteristics will vary in accordance with the number of cores to be switched out of the total number linked by the drive winding. Moreover, differences in the impedances of different drive windings will affect the drive pulses. Where information is written into the memory, variations of the drive pulses may affect the speed as well as the reliability of memory performance. Where information is read out, such variations may show up in the output waveform. In either case, the sensitivity of the drive pulses to loading variations may seriously impair the performance of the memory.

A single read-write driver may energize all the row windings of a core memory, suitably coupled to the selected row winding by selective addressing means. Similarly, a single read-write driver may pulse all the column windings of the core memory under the direction of the aforesaid addressing means. It will be understood that the above-mentioned row and column windings respectively include all corresponding windings in the different core planes which are connected in series. Each read-write driver contains read and write drive sources which may be jointly coupled to the selected drive winding and which are selectively energized during the read and write intervals. In prior art apparatus the combined read-write driver usually employs a pair of matched transistors of the opposite conductivity type which are directly connected to the magnetic core drive winding. Alternatively, a pair of similar-type transistors is used which is connected to the drive winding through an associated coupling transformer. Transistors of opposite conductivity type which exhibit similar operating characteristics are frequently difficult and expensive to obtain. To couple the read-write drive circuit to the drive winding through a coupling transformer, however, often produces undesirable non-linearities in the drive pulse waveform. Moreover, an unbalance in the transformer windings may produce a base line shift of the output waveform to cause a subsequent change in the drive pulse amplitude.

Accordingly, it is an object of the present invention to provide a circuit which is capable of supplying constant amplitude current pulses to a variable impedance load.

It is another object of the present invention to provide a bidirectional current pulse source which provides pulses of constant amplitude and linear rise time for a variable impedance load.

It is a further object of the present invention to provide a read-write drive circuit which is capable of supplying constant amplitude current pulses having a controlled rate of rise to a magnetic core load.

It is an additional object of the present invention to provide a read-write current drive source which employs similar-type transistors directly capable of being connected to a magnetic core load.

In the present invention, an input signal is employed to initiate the charging of a condenser from a D.C. source. The voltage across the condenser governs the potential applied to the base of a transistor whose emitter-collector junction is connected into a load circuit. The voltage rise across the condenser is linear by virtue of a feedback signal from the transistor which further effects an associated bootstrap action to maintain a constant condenser charging current. As a consequence, the transistor current which flows through an emitter resistor similarly rises at a linear rate until the threshold level of a Zener diode, suitably connected to govern the voltage across the emitter resistor, is reached. Thus, the emitter resistor current is independent of load variations so that its rise time and maximum amplitude are precisely predictable.

When the input signal is terminated, the condenser voltage decays at an accurately controlled rate, causing the emitter resistor current to do likewise.

The read amplifier section and the write amplifier section of the present read-write driver each contain one of the aforementioned transistors. Through a novel and improved circuit connection, transistors of a similar type are used which are coupled to the load to provide bipolar constant amplitude current pulses. The absence of transformers in this arrangement further reduces non-linearities in the output signal.

These and other novel features of the invention together with further objects and advantages thereof will become apparent from the following detailed specification with reference to the accompanying drawing in which:

The sole figure illustrates a preferred embodiment of the invention.

Referring now to the drawing, there is shown a pair of transistors 32 and 82 which are connected in a series path between a source of positive biasing potential B+ and a source of negative biasing potential B—. The collector of transistor 32 is returned to the B+ terminal by means of a parallel combination consisting of a resistor 34 and a condenser 36. The emitter of transistor 32 is connected to the junction point of the anode element of a diode 48, a feedback line 40 and to a resistor 38. The latter in turn is connected to the common junction comprising the anode element of diode 46, the anode element of a Zener diode 30 and one end of a condenser 26. The cathode element of diode 46 is connected to an output terminal 106 and to a parallel combination comprising a resistor 84 and a condenser 86. The latter combination is further connected to the collector of a transistor 82. The emitter of transistor 82 is connected to a feedback line 90 and a resistor 88, the latter being returned to the negative source B— by way of a pair of voltage-dropping diodes 96.

The base element of transistor 32 is connected to the junction of the cathode element of diode 48, the anode element of a diode 28, a resistor 24, the other terminal of condenser 26, and to a parallel combination comprising an inductor 20 and a resistor 22. The latter combination is further connected to the collector of a transistor switch 18. The emitter of transistor switch 18 is connected to the B— terminal while its base is connected to one end of a resistor 16 and a coupling condenser 14. The latter is further connected to an input terminal 12. The other end of resistor 16 is returned to the positive biasing source B+. Feedback line 40 is connected from the emitter of transistor 32 to the anode element of a diode 52. The cathode element of diode 52 is connected to the common junction of the cathode of a diode 44, one end of a condenser 42 and one end of a resistor 56. The other end of resistor 56 is connected to the negative potential source B—. The anode of diode 44 is connected to ground. The other end of condenser 42 is connected to the cathode of a diode 50 and to the other end of resistor 24. The anode of diode 50 is returned to the positive potential source B+. The cathode element of diode 28 is connected to the cathode element of Zener diode 30.

The base of transistor 82 is connected to the junction of the anode of a diode 78, one end of condenser 76, a resistor 74 and to a parallel combination consisting of an inductor 70 and a resistor 72. The latter combination is further connected to the collector of a transistor switch 68. The emitter of transistor switch 68 is returned to the B— potential and its base is connected to the junction of a resistor 66 and a coupling condenser 64. The latter is further connected to the input terminal 62. The other end of resistor 66 is returned to the positive potential source B+.

The feedback line 90 is connected between the emitter of transistor 32 and a condenser 92, the latter being further connected to the cathode element of a diode 94 and the other end of resistor 74. The anode element of diode 94 is returned to ground. The cathode of diode 78 is connected to the junction of a resistor 108 and the cathode of a Zener diode 80. The other end of resistor 108 is connected to ground and the anode of Zener diode 30 is connected to the junction of a condenser 98, resistor 88 and the anode of diode 96. The other termial of condenser 98 is connected to ground together with the other end of condenser 76. A variable impedance load 100 is connected between the output terminal 106 and ground. This load includes a series of magnetic core elements 102 threaded by a common drive winding 110.

In operation, the transistor switch 18 is normally maintained in a conductive state. A base current path exists from the positive potential source B+, through the current-limiting resistor 16 and the base-emitter junction of transistor 18 to the negative potential source B—. The collector current path can be traced from the B+ source, through diode 50, resistor 24, the parallel combination of inductor 20 and resistor 22 and the collector-emitter junction of transistor 18 to the B— source. The steady state impedance of the parallel-connected inductor 20 and resistor 22 is small in comparison with that of resistor 24, so that the negative voltage level established at the base of transistor 32 will be essentially that of the B— potential source. Since the emitter of transistor 32 is returned to ground by way of resistor 38, diode 46 and the magnetic core load 100, a reverse-bias potential will exist across the base-emitter junction of transistor 32 to place it in a nonconductive state.

Diode 48 is connected across the base-emitter junction in a direction to limit this reverse-bias voltage to a small value. The voltage at the anode of diode 46 will approximate the B— potential and the reverse-bias potential across this element will effectively disconnect the read driver section from the magnetic core load 100.

It should be noted that at this point of the circuit operation, there is substantially no voltage developed across the condenser 26. Current flow from the B— source through resistor 56 and clamp diode 44 will maintain the cathode of diode 52 at ground potential and the reverse-bias potential established across diode 52 will disconnect the feedback path 40.

Upon the application of a negative-going read signal 10 to the read input terminal 12, transistor switch 18 will become nonconductive. At this time, the voltage at the base of transistor 32 will rise rapidly towards the B+ potential. When this voltage exceeds ground potential, diode 46 will become forward-biased thereby electrically connecting the read driver transistor 32 to the magnetic core load 100. The voltage at the base of transistor 32 will continue to rise at a rate determined by the charging current applied to condenser 26 by way of diode 50 and resistor 24. Diode 48 will become reverse-biased and transistor 32 will start to conduct. The collector current path of transistor 32 can be traced from the B+ source through the parallel combination of resistor 34 and condenser 36, the collector-emitter junction of transistor 32, resistor 38, diode 46 and the magnetic core load 100 to the ground terminal.

The function of the feedback path 40 which is connected between the emitter and base elements of transistor 32 is to linearize the rate of rise of current through the magnetic core load 100. The positive-going signal at the emitter of transistor 32 is coupled to the anode of diode 52 by way of feedback path 40. When this signal exceeds ground potential, diode 52 becomes forward-biased and the clamp diode 44 is electrically disconnected from the circuit. This signal is further coupled through condenser 42 to the common junction of resistor 24 and the cathode of diode 50. The positive-going signal will add to the B+ potential existing at this junction to disconnect diode 50.

The magnitude of the feedback voltage coupled through the feedback path 40 will be approximately equal to the instantaneous voltage developed across condenser 26. As the voltage at one end of resistor 24 becomes positive because of the charging action of condenser 26, the voltage at the other end of this resistor is increased by the same amount due to the feedback voltage coupled through condenser 42. A bootstrap action is obtained whereby the charging current through condenser 26 is maintained constant. Thus, the voltage across this condenser will increase at a linear rate. Since condenser 26 is connected in parallel with the series-connected base-emitter junction of transistor 32 and resistor 38, the linear voltage rise across it will cause a linear rise in the base current and consequently in the collector current of transistor 32. As previously noted, this collector current will flow through the drive winding 110 which links the magnetic core load 100.

The current flow through the magnetic core load 100 will continue to increase linearly until such time as the threshold voltage of Zener diode 30 has been reached. Since the current flow through emitter resistor 38 is determined by the voltage level of Zener diode 30 it is independent of the impedance presented by the magnetic core load to the read driver circuitry. Inasmuch as the rate of rise of current through the magnetic core load and also the maximum amplitude of this current are independent of the impedance of the load, the maximum amplitude of an output signal induced into the sense winding from a switching core will predictably occur during the specified strobing period.

Excessive power dissipation in transistor 32 during its steady state conduction period is avoided by the presence of the parallel-connected resistor 34 and condenser 36 in series with the collector current path. During the rise of the output signal, condenser 36 provides a shunt path for current flow about resistor 34. Once the steady state current flow condition has been reached, condenser 36 will assume a charge allowing a portion of the steady state power to be dissipated in the resistor 34.

When the read input signal 10 again goes positive, transistor switch 18 will become conductive and its collector element will be switched to the B− source. At this time, condenser 26 will discharge through a path which includes the parallel-connected inductor 20 and resistor 22, and the collector-emitter path of transistor switch 18. The discharge time constant established by these components will determine the rate of decay of current through the magnetic core load 100. This controlled rate of decay serves to reduce noise transients induced in the sense winding during this interval. When the voltage of the base of transistor 32 reaches to ground potential, transistor 32 will cut off, diode 46 will become reverse-biased and the read driver section of the bidirectional current amplifier will be electrically disconnected from the output load 100.

Considering now the operation of the write driver section, transistor switch 68 is normally maintained in a conductive state. The base current path includes the B+ source, resistor 66, the base-emitter junction of transistor 68 and the B− source. The collector current path can be traced from the ground terminal, through diode 94, resistor 74, the parallel combination of inductor 70 and resistor 72 and through the collector-emitter path of transistor 78 to the B− source. The voltage at the base of transistor 82 will be approximately that of the negative potential supply B−. In order to ensure that transistor 82 is normally held in a cut-off condition, the emitter is maintained at a slightly positive potential with respect to the base by means of the voltage-dropping diodes 96.

Upon the application of the negative-going write signal 60 to the write input terminal 62, transistor switch 68 will become non-conductive. The positive-going signal at the base of transistor 82 will cause the latter to conduct at a rate determined by the charging of condenser 76. The output signal at the emitter of transistor 82 will be coupled back to the base by way of the feedback path 90 which includes condenser 92 and resistor 74. This positive-going signal will disconnect diode 94, and condenser 76 will continue to charge due to the current flow through the feedback path 90. The feedback signal will be substantially equal in magnitude to the instantaneous voltage developed across condenser 76. Thus, as one end of resistor 74 goes positive because of the charging of condenser 76, the potential at the other end of resistor 74 rises by the same amount due to the feedback voltage through condenser 92. This bootstrap action will result in a constant charging current through condenser 76 and a linear rate of rise of voltage at the base of transistor 82. The collector current of transistor 82 will also increase at a linear rate and this current will flow through the magnetic core load 100. The magnetic core load is connected in the collector path of transistor 82 such that the current flow through the load will be in a reverse direction from that flowing during the read interval.

The Zener diode 80 is normally held in a conductive state by means of a current path which includes the ground terminal, resistor 108, Zener diode 80, the voltage-dropping diodes 96 and the B− potential source. Diode 78 is reverse-biased until such time as the increasing voltage at the base of transistor 82 exceeds the Zener threshold level. When this occurs, diode 78 will conduct and establish a fixed current flow through the emitter resistor 88. The constant current flow through the emitter-resistor 88 also flows through the magnetic core load 100. This controlled rate of rise of current flow through the magnetic core load 100, together with the constant amplitude current pulses applied to this load, will assure that the cores receiving coincident current pulses from a pair of drive sources will switch at a predetermined time interval and that non-selected cores receiving only one drive pulse will be held in their initial magnetic state. The parallel-connected resistor 84 and condenser 86 serve to limit the steady-state power dissipation through transistor 82.

When the write input signal 60 returns to ground potential, transistor switch 78 again becomes conductive and the current flow through the variable impedance load 100 decreases at a rate determined by the discharge of condenser 76 through the parallel-connected inductor 70 and resistor 72.

The waveform 104 illustrates the current flow through the magnetic core load 100 which is produced by the application of read and write pulse signals to their respective input terminals. This waveform exhibits a uniform current rise, a controlled maximum current amplitude, and a controlled current decay time, all of which are independent of the impedance presented by the load to the read-write drive circuitry.

While there has been illustrated and described a preferred embodiment of the invention, it is to be understood that the above-described embodiment, arrangement of circuit components and construction of elemental parts are only illustrative of an application of the principles of the invention. Numerous modifications, variations, substitutions and equivalents will now suggest themselves to those skilled in the art, all of which may be effected without departing from the true spirit and scope of the invention as defined by the appended claims.

What is claimed is:

1. A bipolar current pulse source for a magnetic core load comprising, read amplifier and write amplifier sections having individual input terminals and a common output terminal, switching means corresponding to each of said sections and adapted to provide input signals, means for inductively coupling each of said switching means to an input terminal, each of said sections including a transistor, a first series combination coupled between the emitter and base of said transistor and including resistor means and a voltage regulating device coupled to a common junction, a condenser connected to said base adapted to control the rate of rise of voltage at said base, said condenser being adapted to discharge at a predetermined rate through said inductive coupling means, a feedback path coupled between the emitter and base of said transistor adapted to provide a linear rate of voltage rise at said base, means for coupling the base of said transistor to its corresponding input terminal, means for coupling said common output terminal to said common junction in said read amplifier section and to the collector of the transistor in said write amplifier section, means for applying a first D.C. potential to the collector of the transistor in said read amplifier section, means for applying a second D.C. potential to said common junction in said write amplifier section, and means for selectively energizing said inputs.

2. A bipolar current pulse source for a magnetic core load comprising, read amplifier and write amplifier sections having individual input terminals and a common output terminal, each of said sections including a transistor, a first series combination coupled between the emitter and base of said transistor and including resistor means and a voltage regulating device coupled to a common junction, a condenser connected to said base adapted to control the rate of rise of voltage at said base, a feedback path coupled between the emitter and base of said transistor adapted to provide a linear rate of voltage rise at said base, means for coupling the base of said transistor to its corresponding input terminal, means for coupling said common output terminal to said common junction in said read amplifier section and to the collector of the transistor in said write amplifier section, means for applying a first D.C. potential to the collector of the transistor in said read amplifier section, means for applying a second D.C. potential to said common junction in said write amplifier section, and means for selectively energizing said inputs.

3. A bidirectional current driver for use with a variable impedance load comprising, first and second amplifier sections, each of said sections including a transistor having an input circuit and an output circuit, said input circuit including the base and emitter of said transistor and said output circuit including the collector and emitter of said transistor, said input circuit including a condenser adapted to control the rise time of the current flow through said output circuit, said input circuit further including a voltage regulator adapted to control the maximum amplitude of said current flow, a feedback loop connected between said emitter and said base adapted to linearize the rate of rise of said current flow, means coupled to said input circuit to discharge said condenser at a predetermined rate to control the decay of said current flow, an output terminal adapted to be coupled to said variable impedance load, and means for selectively coupling the output circuits of said first and second amplifier sections respectively to said output terminal to provide a current flow through said load in opposite directions which is substantially independent of load impedance variations.

4. A bidirectional current driver for use with a variable impedance load comprising, first and second amplifier sections, each of said sections including a transistor having an input circuit and an output circuit, said input circuit including the base and emitter of said transistor and said output circuit including the collector and emitter of said transistor, said input circuit including a condenser adapted to control the rise time of the current flow through said output circuit, said input circuit further including a voltage regulator adapted to control the maximum amplitude of said current flow, a feedback loop connected between said emitter and said base adapted to linearize the rate of rise of said current flow, an output terminal adapted to be coupled to said variable impedance load, and means for selectively coupling the output circuits of said first and second amplifier sections respectively to said output terminal to provide a current flow through said load in opposite directions which is substantially independent of load impedance variations.

5. A bidirectional current driver for use with a variable impedance load comprising, first and second amplifier sections, each of said sections including a transistor having an input circuit and an output circuit, said input circuit including the base and emitter of said transistor and said output circuit including the collector and emitter of said transistor, said input circuit including a condenser adapted to control the rise time of the current flow through said output circuit, said input circuit further including a voltage regulator adapted to control the maximum amplitude of said current flow, an output terminal adapted to be coupled to said variable impedance load, and means for selectively coupling the output circuits of said first and second amplifier sections respectively to said output terminal to provide a current flow through said load in opposite directions which is substantially independent of load impedance variations.

6. A pulse circuit for driving a variable impedance load comprising, a transistor having a base, an emitter and a collector, means for applying input pulses to said base, first resistor means and voltage regulating means connected in series by a common junction between said emitter and said base, condenser means connected between said base and said common junction adapted to control the rate of rise of said input pulses, an A.C. feedback path connected between said emitter and said base, said feedback path including second resistor means coupled in series with said condenser, means for coupling a D.C. voltage to said collector, and means for deriving load drive pulses at said common junction, said drive pulses having a substantially linear rise time and an amplitude which is substantially independent of load impedance variations.

7. A pulse circuit for driving a variable impedance load comprising, a transistor having a base, an emitter and a collector, means for applying input pulses to said base, resistor means and voltage regulating means connected in series by a common junction between said emitter and said base, condenser means connected between said base and said common junction adapted to control the rate of rise of said input pulses, an A.C. feedback path connected between said emitter and said base, means for coupling a D.C. voltage to said collector, and means for deriving load drive pulses at said common junction, said drive pulses having a substantially linear rise time and an amplitude which is substantially independent of load impedance variations.

8. In a pulse circuit for a variable impedance load, transistor means having first, second and third terminals, means for applying input pulses to said first terminal, capacitive means and voltage regulating means respectively coupled to said first terminal, a common junction coupling said capacitive means and said voltage regulating means, resistive means between said common junction and said second terminal, means for applying a D.C. potential to said third terminal, and means for deriving load drive pulses at said common junction.

9. In a pulse circuit for a variable impedance load, transistor means having first, second and third terminals, means for applying input pulses to said first terminal, resistive means and voltage regulating means coupled in series by a common junction point between said first and second terminals, condenser means coupled between said first terminal and said voltage regulating means, means for applying a D.C. potential to said common junction point, and means for deriving load drive pulses at said third terminal.

10. A pulse circuit for driving a variable impedance load comprising, a transistor having a base, an emitter and a collector, means for applying input pulses to said base, resistor means and voltage regulating means connected in series by a common junction between said emitter and said base, condenser means coupled between said base and said voltage regulating means adapted to control the rate of rise of said input pulses, an A.C. feedback path connected between said emitter and said base, means for coupling a D.C. potential to said common junction, and means for deriving load drive pulses at said collector, said load drive pulses having a substantially linear rise time and an amplitude which is substantially independent of load impedance variations.

11. A pulse circuit for driving a variable impedance load comprising, a transistor having a base, an emitter and a collector, means for applying input pulses to said base, first resistor means and voltage regulating means connected in series by a common junction between said emitter and said base, condenser means coupled between said base and said voltage regulating means adapted to control the rate of rise of said input pulses, an A.C. feedback path connected between said emitter and said base, said feedback path including second resistor means coupled in series with said condenser, means for coupling a D.C. potential to said common junction, and means for deriving load drive pulses at said collector, said load drive pulses having a substantially linear rise time and an amplitude which is substantially independent of load impedance variations.

12. A bipolar current pulse source for a magnetic core load comprising, read amplifier and write amplifier sections having individual input terminals and a common output terminal, each of said sections including a transistor, a first series combination coupled between the emitter and base of said transistor and including first resistor means and a voltage regulating device coupled to a common junction, a condenser connected to said base adapted to control the rate of rise of voltage at said base, a feedback path coupled between the emitter and base of said transistor, said feedback path including second resistor means coupled in series with said condenser, the voltage across said second resistor means remaining constant to provide a linear voltage rise across said condenser, means for coupling the base of said transistor to its corresponding input terminal, means for coupling said common output terminal to said common junction in said read amplifier section and to the collector of the transistor in said write amplifier section, means for applying a first D.C. potential to the collector of the transistor in said read amplifier section, means for applying a second D.C. potential to said common junction in said write amplifier section, and means for selectively energizing said inputs.

13. A bipolar current pulse source for a magnetic core memory comprising, read amplifier and write amplifier sections having individual input terminals and a common output terminal, each of said sections including a transistor, a first series combination coupled between the emitter and base of said transistor and including a resistor and a voltage-regulating device, a condenser connected to said base adapted to control the rate of rise of voltage at said base, a parallel resistor-condenser combination having one terminal connected to the collector of said transistor, a feedback circuit having a second series combination coupled between the emitter and base of said transistor including a condenser and a resistor, a switching circuit coupled to said input terminal, a parallel inductor-resistor combination connected between the base of said transistor and said switching circuit, said common output terminal being coupled to the common junction of said first series combination in said read amplifier section, means for applying a positive D.C. potential to the other terminal of said parallel resistor-condenser combination in said read amplifier section, the other terminal of said parallel resistor-condenser combination in said write amplifier section being coupled to said common output terminal, means for applying a negative D.C. potential to the the common junction of said first series combination in said write amplifier section, and means for selectively energizing said input terminals.

No references cited.